June 23, 1953  H. A. TRIEBES ET AL  2,642,569
SUN GUARD FOR THE EYES

Filed Dec. 21, 1950  2 Sheets-Sheet 1

INVENTORS:
Herman A. Triebes
Helen E. Triebes
By:
Joseph M. Gartner,
ATTY.

June 23, 1953     H. A. TRIEBES ET AL     2,642,569
SUN GUARD FOR THE EYES
Filed Dec. 21, 1950     2 Sheets-Sheet 2
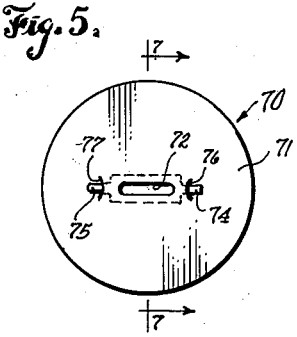
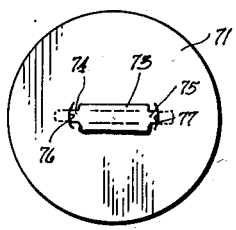
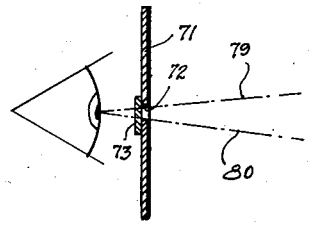
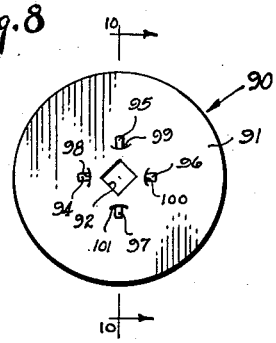
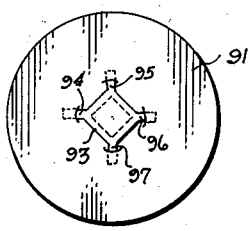
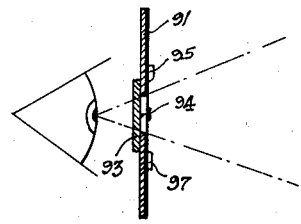
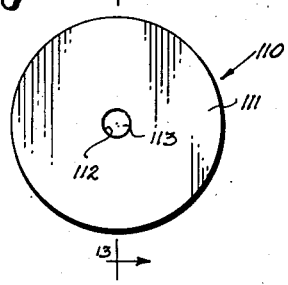
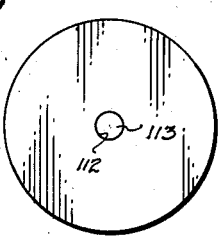
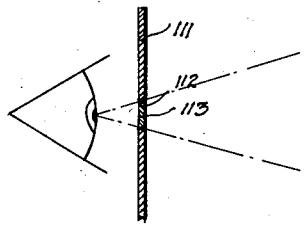
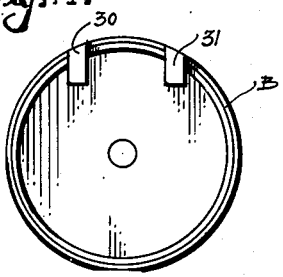
INVENTORS:
Herman A. Triebes
Helen E. Triebes
BY: Joseph M. Gartner,
ATTY.

Patented June 23, 1953

2,642,569

UNITED STATES PATENT OFFICE 2,642,569

SUN GUARD FOR THE EYES

Herman A. Triebes and Helen E. Triebes,
Forest Park, Ill.

Application December 21, 1950, Serial No. 201,938

4 Claims. (Cl. 2—14)

This invention relates, in general, to sun guards for the eyes as distinguished from conventional sun glasses and is particularly concerned with lenses which may be employed to protect the eyes of the user from destructive effects resulting from excessive exposure of the eyes to the strong rays of the sun as in the case, for example, of sun bathing.

Otherwise stated, the invention is concerned with sun guards for the eyes in which opaque material having peep holes covered with a semi-opaque material is substituted for the usual lenses and whereby the amount of light or strong rays of the sun accessible to the eyes of the user is controlled to prevent irritation of the eyes and yet provide sufficient vision so as not to obstruct the view completely.

As distinguished from conventional smoked sun glasses in which vision is not impaired and which may be worn when the user is walking or moving about, the instant invention contemplates the provision of sun guards for the eyes particularly adaptable for sun bathing or sun lamp activities where the user is not moving about and does not require unrestricted vision but where the user is subject to destructive effects to the eyes resulting from the concentrated and excessive exposure thereof to the strong rays of the sun or sun lamp, the invention further contemplating means whereby the user may have limited vision for limited activity.

An ancillary object and accomplishment of the invention is to provide a new and improved sun guard for the eyes which is adapted to be economically manufactured and which is so designed as to permit the manufacture and assembly thereof in accordance with present day large scale mass-production manufacturing methods of construction and assembly.

The invention seeks, as a final object and accomplishment, to provide a sun guard for the eyes particularly characterized by a design arrangement to perform more advantageously and satisfactorily the functions required of it and adapted to provide a compact unit which will successively combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claims.

Embodiments of the invention are illustrated in the accompanying drawings forming a part hereof and wherein:

Fig. 5 is a front elevational view of a modified form of sun guard lens contemplated by this invention;

Fig. 6 is a rear elevational view of the sun guard lens depicted in Fig. 5;

Fig. 7 is a sectional view of the sun guard lens depicted in Fig. 5 and being taken substantially on the plane of the line 7—7 in Fig. 5;

Fig. 8 is a front elevational view of a modified form of sun guard lens contemplated by this invention;

Fig. 9 is a rear elevational view of the sun guard lens depicted in Fig. 8;

Fig. 10 is a sectional view of the sun guard lens depicted in Fig. 8 and being taken substantially on the plane of the line 10—10 in Fig. 8;

Fig. 11 is a front elevational view of a modified form of sun guard lens contemplated by this invention;

Fig. 12 is a rear elevational view of the sun guard lens depicted in Fig. 11;

Fig. 13 is a sectional view of the sun guard lens depicted in Fig. 11 and being taken substantially on the plane of the line 13—13 in Fig. 11; and Fig. 14 is an elevational view of an individual lens frame employing clips adapted to secure the same to conventional prescription glasses and adapted to have any one of the aforementioned lenses contemplated by this invention disposed therein.

The drawings are to be understood to be more or less of a schematic character for the purpose of illustrating and disclosing typical or preferred forms of the improvements contemplated herein and in the drawings like reference characters identify the same parts in the several views.

Figure 1:
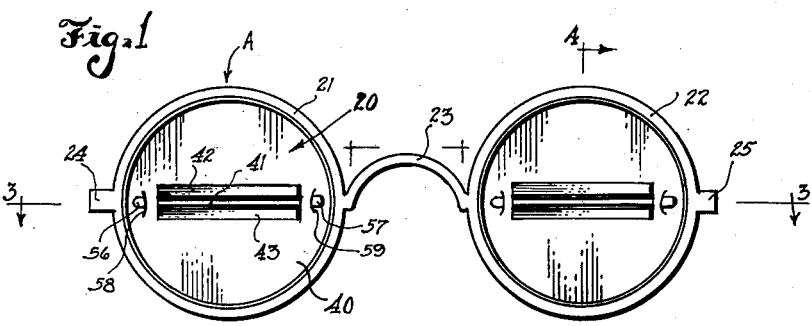
Fig. 1 is a front elevational view of a sun guard embodying the features of this invention.
Figure 2:
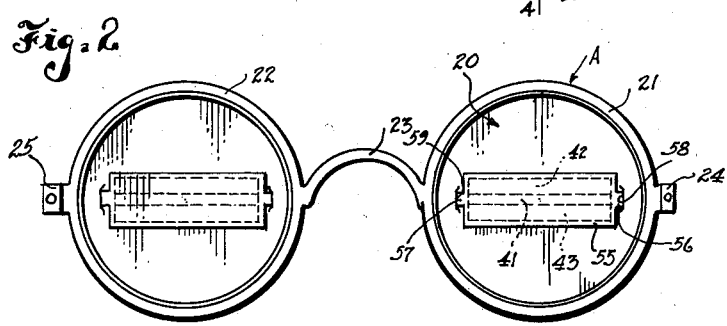
Fig. 2 is a rear elevational view of the sun guard depicted in Fig. 1.
Figure 3:
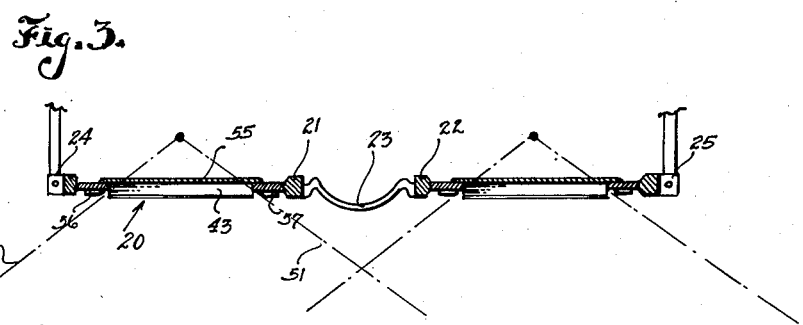
Fig. 3 is a sectional view of the sun guard depicted in Fig. 1 and being taken substantially on the plane of the line 3—3 in Fig. 1.

As one possible example of advantageous employment of the contemplated sun guard lenses, reference is made to the drawings, particularly Figs. 1, 2 and 3, wherein there is illustrated one form of the especially designed sun guard lens with which the invention is particularly concerned and designated in its entirety by the numeral 20 as being operatively disposed in a frame designated in its entirety by the letter A.

The illustrated frame A may comprise a pair of loops 21 and 22, shown for purposes of illustration as being of annular shape but it is understood that they may be formed to define any of the many conventional shapes presently on the market, said loops being separated by a nose piece 23, and each of said loops may be provided with temple pieces respectively as at 24 and 25 for the purpose of supporting the sun guard in the conventional manner.

As another possible example of advantageous employment of the sun guard lenses contemplated herein, attention is invited to Fig. 14 wherein therein is illustrated a frame B particularly adaptable for adjunctive employment with prescription glasses, this being accomplished by the provision of integral hinges as at 30 and 31 which are adaptable to grip the frame of the prescription glasses (not shown), it being understood that two frames as at B are necessary to respectively accommodate each of the prescription lenses. Moreover, it is obvious that any of the forms of sun guard lenses contemplated herein may be disposed within the frame B.

Suffice it to say, since the invention is not particularly concerned with the precise construction of the frames A and B as illustrated, and/or their associated parts, they will not be further described in detail, and it is deemed sufficient for all intentions and purposes herein contained to show only portions thereof adjacent to and cooperating with the sun guard lenses contemplated herein.

It is to be understood that details of construction of such frames as at A and B with which the sun guard lenses contemplated herein may advantageously be employed, and/or their associated parts, may be modified to suit particular conditions or to satisfy the engineering genius of various manufacturers, and we do not wish to be limited to the shape, design or construction of these elements as set forth except where such construction particularly concerns the invention contemplated herein.

It is recognized that in the prior art numerous attempts have been made to provide means to protect the eyes from destructive effects caused by excessive exposure to the sun rays, but to the best of the applicants' knowledge none of the prior art models could be advantageously adapted for sun bathing or sun lamp activities and only very few of the prior art structures have had limited successful applications and have been accorded only limited commercial recognition.

It is believed that this fact results from the deficiencies of the prior art structures, and their non-adaptability to effectively overcome the difficulties attendant with applications as contemplated by this invention.

Having thus described, by way of example, possible adaptations of the sun guards contemplated herein and having described the general environment surrounding the adaptations, the specific construction and cooperating function of the parts of said sun guards will now be described in detail.

In the exemplary embodiment of the invention depicted in Figs. 1, 2, 3 and 4, the sun guard lenses 20 with which the present invention is particularly concerned comprise, in general, a disc 40 the periphery of which may be of any particular shape adaptable to be received in a frame, said disc being formed of an opaque material such as, for example, plastic or a material having similar characteristics, and said disc having a horizontally extending substantially centrally disposed slot 41 adapted to permit vision therethrough and formed by cutting a horizontal line and vertical lines respectively at each end of the horizontal line and, thereafter, bending outwardly out of the normal plane defined by the disc, portions of the disc defined by the cut lines to provide two integral struck out tongues 42 and 43 providing the slot 41.

Figure 4:
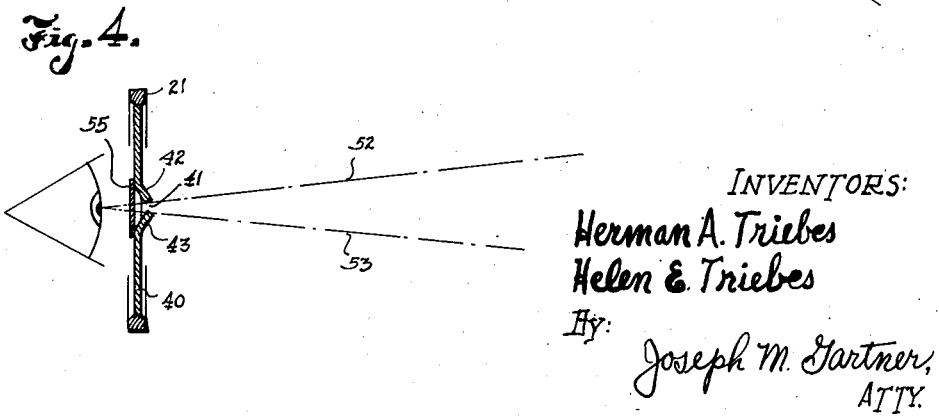
Fig. 4 is a sectional view of a portion of the sun guard depicted in Fig. 1 and being taken substantially on the plane of the line 4—4 in Fig. 1.

As can best be seen in Figs. 3 and 4, the range of vision in a horizontal plane defined by the lines 50 and 51 (Fig. 3) is substantially greater than the range of vision in the vertical plane defined by the lines 52 and 53 (Fig. 4). The limited range of vision in the vertical plane is of no great importance since the vision in this plane can be increased by merely moving the head upwardly or downwardly, but it is extremely desirable to have the range of vision in the horizontal plane in an amount substantially as indicated in Fig. 3 because the user, when employing the contemplated sun guards, will usually desire a great range of vision on a horizontal plane and which will be sufficient for all intentions and purposes herein contemplated.

Thus, it can be seen that the strong rays of the sun are prevented from passing through the slot 41 and to the eyeball of the user thereby preventing destructive effects and irritation to the eyes caused by excessive and direct exposure of same to the strong rays of the sun. Because of the limited opening of the slot 41 defined by the integral struck out portions 42 and 43, the direct rays of the sun can not enter the lens unless the rays of the sun are within the range defined by the lines 52 and 53. Thus, the user may conveniently turn his head to a position so that the direct rays of the sun are not within the range defined by the lines 52 and 53.

In order to further assure the eyes of the user from being subject to the direct and indirect rays of the sun, there is provided a semi-opaque window 55 covering the slot 41 and being preferably disposed on the back surface of the disc 40 and being secured thereto by means of integral tongues 56 and 57 respectively disposed at each end of the window 55 and adapted to be received into, respectively, slots 58 and 59 formed in the disc 40 substantially midway between the periphery of the disc 40 and the extreme end portions of the slot 41, these tongues 56 and 57 being bent over as indicated to fixedly secure the window 55 in its operative position as shown.

Thus, it can be seen that the window will permit vision therethrough but will protect the eyes to a degree against any destructive effects thereto caused by direct or any indirect rays of the sun.

which may possibly enter, to a limited and restricted degree, the slot 41. Moreover, the window has an ancillary effect in that, because of the darkening effect in the areas defined by the disc 40, the pupils of the eyes may be irritated due to the extreme brightness within the range of vision, but this brightness is substantially subdued, in this invention, by the provision of the window 55 which is formed of a semi-opaque material adapted to permit vision therethrough and yet filter the light rays.

Attention is next directed to Figs. 5, 6, and 7, wherein there is illustrated a modified form of sun guard lens contemplated by this invention and indicated in its entirety by the numeral 70. It can be seen that the lens 70 comprises, in general, an opaque disc 71 the periphery of which may be of any particular shape adaptable to be received in a frame, said disc being formed of an opaque material, such as, for example, plastic or a material having similar characteristics, and said disc having a horizontally extending substantially centrally disposed slot 72 adapted to permit vision therethrough, and said disc 71 having secured to the back surface thereof a window 73 (Fig. 6) to cover the opening defined by the slot 72 and being secured to the disc 71 by means of integral tongues 74 and 75 respectively disposed at each end of the window 73 and adapted to be received, respectively, into slots 76 and 77 disposed in the disc 71, these integral tongues being bent over in order to fixedly secure the window in its operative position. Thus, it can be seen in Fig. 7 that the range of vertical vision is defined by the lines 79 and 80 while the range of vision in a horizontal plane will be defined by the limitations of vision of the slot 72.

Attention is next directed to Figs. 8, 9, and 10, wherein there is illustrated another modified form of sun guard lens contemplated by this invention, said lens being indicated in its entirety by the numeral 90 and comprising, in general, a disc 91 formed of an opaque material, such as, for example, plastic or a material having similar characteristics and said disc having a diamond shaped through aperture 92 adapted to permit vision therethrough with a range of vision equal in both horizontal and vertical planes as indicated in Fig. 10. The disc 91 is provided with a substantially diamond shaped window 93 formed of a semi-opaque material and adapted to cover the through opening 92, said window being disposed on the back surface of the disc 91 and being secured thereto by means of tongues 94, 95, 96 and 97, adapted to be received, respectively, in suitable slots 98, 99, 100, and 101, thereby to fixedly secure the window 93 in its operative position as indicated.

In Figs. 11, 12, and 13, there is illustrated another modified form of a sun guard lens as contemplated by this invention. This lens is indicated in its entirety by the numeral 110 and comprises, in general, a disc 111 formed of an opaque material, such as, for example, plastic or a material having similar characteristics, and said disc having a substantially circular shaped through aperture 112 adapted to permit vision therethrough and said aperture 112 being adapted to receive a window 113 formed of a semi-opaque material adaptable for the same purposes hereinbefore described with respect to the other forms disclosed.

As distinguished from conventional smoked sun glasses in which vision is not impaired and which may be worn when the user is walking about, the instant invention as disclosed provides a sun guard lens for the eyes particularly adaptable for sun bathing or sun lamp activities where the user is not moving about and does not require unrestricted vision and where the user is subject to destructive effects to the eyes resulting from the concentrated and excessive exposure thereof to the strong rays of the sun or the sun lamp usually attendant with sun bathing or sun lamp activities but where the user may have limited vision for limited activities.

The instant sun guard for the eyes, being formed of simple parts and readily available materials, lends itself to mass-production manufacturing principles, thus affording a substantial saving in the manufacturing costs.

From the foregoing disclosure, it may be observed that we have provided an improved sun guard for the eyes which efficiently fulfills the objects thereof as hereinbefore stated and which provides numerous advantages which may be summarized as follows:

1. Structurally simple, efficient and durable;
2. Economical to manufacture and readily adaptable to mass-production manufacturing principles; and
3. The provision of a sun guard for the eyes in which opaque material having peep holes covered with a semi-opaque material is substituted for the usual lenses and whereby the amount of light or strong rays of the sun accessible to the eyes of the user is controlled to prevent irritation of the eyes and yet provide sufficient vision so as not to obstruct the view completely.

While we have illustrated embodiments of our invention, many modifications may be made without departing from the spirit of the invention, and we do not wish to be limited to the precise details of construction set forth but wish to avail ourselves of all changes within the scope of the appended claims.

We claim:

1. A sun guard for the eyes comprising: an opaque disc having a relatively small sight opening for limited vision therethrough and having slots spaced between the respective edges of said sight opening and the peripheral edge of said opaque disc; and a semi-opaque plate arranged on the inner surface of said opaque disc and providing a cover for said sight opening, said semi-opaque plate having tongues projecting beyond the marginal edges thereof and respectively inserted in said slots for removably supporting said semi-opaque plate on said disc.

2. A sun guard for the eyes according to claim 1 wherein the sight opening of said opaque disc is defined by a horizontally elongate I-shaped slot with the leaf portions between the cross members of the I-shape extending outwardly and defining oppositely directed louvers arranged oblique to the plane of said opaque disc, and the space between said louvers defining the relatively narrow light restricting sight opening.

3. A sun guard for the eyes according to claim 1 wherein the sight opening is defined by a diamond shape and the slots in said opaque disc are located adjacent at least two corners of the diamond and spaced between the respective corner edges of said sight opening and the peripheral edge of said opaque disc, and the semi-opaque plate is defined by a diamond shape with tongues projecting from at least two corners thereof and respectively inserted in said slots for removably supporting said semi-opaque plate on said disc.

4. A sun guard according to claim 1 wherein the sight opening is defined by a relatively narrow horizontally elongate slit and the slots in said opaque disc are disposed vertically at opposite sides of said sight opening and spaced between the respective side marginal edges of said sight opening and the peripheral edge of said opaque disc, and said semi-opaque plate is defined by a horizontally elongate shape with tongues projecting beyond the vertical end edges in said plate and are inserted in said slots for removably supporting said semi-opaque plate on said disc.

HERMAN A. TRIEBES.
HELEN E. TRIEBES.

References Cited in the file of this patent

UNITED STATES PATENTS

| Number | Name | Date |
|---|---|---|
| 1,206,132 | Otte | Nov. 28, 1916 |
| 1,336,009 | Wilmer | Apr. 6, 1920 |
| 1,677,089 | Hopewell | July 10, 1928 |
| 1,982,650 | Fletcher | Dec. 4, 1934 |

FOREIGN PATENTS

| Number | Country | Date |
|---|---|---|
| 401,083 | Great Britain | Nov. 9, 1933 |